United States Patent
Jung et al.

(10) Patent No.: US 11,165,055 B2
(45) Date of Patent: Nov. 2, 2021

(54) NEGATIVE ELECTRODE ACTIVE MATERIAL, AND NEGATIVE ELECTRODE AND LITHIUM SECONDARY BATTERY WHICH INCLUDE THE SAME

(71) Applicant: LG CHEM, LTD., Seoul (KR)

(72) Inventors: Dong Sub Jung, Daejeon (KR); Oh Byong Chae, Daejeon (KR); Eun Kyung Kim, Daejeon (KR); Ju Ho Chung, Daejeon (KR); Chang Ju Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 291 days.

(21) Appl. No.: 16/343,239

(22) PCT Filed: May 10, 2018

(86) PCT No.: PCT/KR2018/005406
§ 371 (c)(1),
(2) Date: Apr. 18, 2019

(87) PCT Pub. No.: WO2018/225959
PCT Pub. Date: Dec. 13, 2018

(65) Prior Publication Data
US 2019/0260019 A1    Aug. 22, 2019

(30) Foreign Application Priority Data

Jun. 9, 2017 (KR) .................. 10-2017-0072586

(51) Int. Cl.
| | |
|---|---|
| H01M 4/36 | (2006.01) |
| H01M 4/587 | (2010.01) |
| H01M 4/62 | (2006.01) |
| H01M 10/0525 | (2010.01) |
| H01M 4/134 | (2010.01) |
| H01M 4/133 | (2010.01) |
| H01M 4/38 | (2006.01) |
| H01M 4/58 | (2010.01) |
| H01M 4/136 | (2010.01) |
| H01M 4/02 | (2006.01) |

(52) U.S. Cl.
CPC .......... H01M 4/366 (2013.01); H01M 4/133 (2013.01); H01M 4/134 (2013.01); H01M 4/136 (2013.01); H01M 4/386 (2013.01); H01M 4/387 (2013.01); H01M 4/58 (2013.01); H01M 4/587 (2013.01); H01M 4/62 (2013.01); H01M 10/0525 (2013.01); H01M 2004/021 (2013.01); H01M 2004/027 (2013.01)

(58) Field of Classification Search
None
See application file for complete search history.

(56) References Cited

U.S. PATENT DOCUMENTS

| | | |
|---|---|---|
| 2007/0128517 A1 | 6/2007 | Christensen et al. |
| 2008/0268338 A1 | 10/2008 | Lee et al. |
| 2010/0136432 A1 | 6/2010 | Kim |
| 2012/0052388 A1 | 3/2012 | Jung et al. |
| 2013/0330620 A1 | 12/2013 | Nishimura et al. |
| 2014/0050979 A1 | 2/2014 | Woo et al. |
| 2014/0234714 A1 | 8/2014 | Cho et al. |
| 2015/0017527 A1 | 1/2015 | Lee et al. |
| 2016/0190596 A1 | 6/2016 | Mah et al. |
| 2017/0162868 A1 | 6/2017 | Kim et al. |

FOREIGN PATENT DOCUMENTS

| | | |
|---|---|---|
| CN | 1492524 A | 4/2004 |
| CN | 101295781 A | 10/2008 |
| CN | 101322266 A | 12/2008 |
| CN | 101527358 A | 9/2009 |
| CN | 101969111 A | 2/2011 |
| CN | 102511094 A | 6/2012 |
| CN | 102844918 A | 12/2012 |
| CN | 103222092 A | 7/2013 |
| CN | 103477477 A | 12/2013 |
| CN | 104995772 A | 10/2015 |
| CN | 105489840 A | 4/2016 |
| CN | 105576221 A | 5/2016 |
| EP | 2824734 A1 | 1/2015 |
| JP | 2014-139942 A | 7/2014 |
| KR | 10-2000-0051682 A | 8/2000 |
| KR | 10-1057162 B1 | 8/2011 |
| KR | 10-2013-0065371 A | 6/2013 |
| KR | 10-2014-0104067 A | 8/2014 |
| KR | 10-2015-0008327 A | 1/2015 |
| KR | 10-2016-0038540 A | 4/2016 |
| KR | 10-2016-0081689 A | 7/2016 |
| KR | 10-2017-0048210 A | 5/2017 |

OTHER PUBLICATIONS

KR 20150008327 English tranlsation. Obtained via Google Patents May 5, 2021 (Year: 2015).*
KR 20160081689 English tranlsation. Obtained via Google Patents May 5, 2021 (Year: 2016).*
KR 20170048210 English tranlsation. Obtained via Google Patents May 5, 2021 (Year: 2017).*
International Search Report (PCT/ISA/210) issued in PCT/KR2018/005406, dated Aug. 23, 2018.

(Continued)

*Primary Examiner* — Sarah A. Slifka
(74) *Attorney, Agent, or Firm* — Birch, Stewart, Kolasch & Birch, LLP

(57) ABSTRACT

A negative electrode active material which may dramatically improve stability of a battery while not degrading battery performance such as cycle characteristics, and a negative electrode and a lithium secondary battery which include the same, wherein the negative electrode active material includes negative electrode active material particles which include artificial graphite in the form of a secondary particle and a carbon layer formed on the surface of the artificial graphite, and a coating layer which is formed on the negative electrode active material particle and includes a compound represented by Formula 1.

8 Claims, No Drawings

(56) References Cited

OTHER PUBLICATIONS

European Search Report for Appl. No. 18813915.8 dated Sep. 9, 2019.
Zuo, P., et al. "Synthesis and electrochemical performance of Si/Cu and Si/Cu/graphite composite anode," Materials Chemistry and Physics, Jul. 19, 2007, vol. 104, No. 2-3, pp. 444-447.
Jung et al., "Preparation of Nano-Sized Graphite-Supported CuO and Cu—Sn as Active Materials in Litihium Ion Batteries," Journal of Nanoscience and Nanotechnology, vol. 12, No. 4, 2012, pp. 3317-3321.

* cited by examiner

NEGATIVE ELECTRODE ACTIVE MATERIAL, AND NEGATIVE ELECTRODE AND LITHIUM SECONDARY BATTERY WHICH INCLUDE THE SAME

CROSS-REFERENCE TO RELATED APPLICATIONS

This application claims the benefit of Korean Patent Application No. 10-2017-0072586, filed on Jun. 9, 2017, in the Korean Intellectual Property Office, the disclosure of which is incorporated herein in its entirety by reference.

TECHNICAL FIELD

Technical Field

The present invention relates to a negative electrode active material, and a negative electrode and a lithium secondary battery which include the same, and more particularly, to a negative electrode active material having improved stability during high-temperature exposure or overcharge, and a negative electrode and a lithium secondary battery which include the same.

Background Art

Demand for secondary batteries as an energy source has been significantly increased as technology development and demand with respect to mobile devices or electric vehicles have increased, and, among these secondary batteries, lithium secondary batteries having high energy density, high operating potential, long cycle life, and low self-discharging rate have been commercialized and widely used. However, the lithium secondary batteries may easily explode or ignite during high-temperature exposure or overcharge due to high energy density and power density, and, in fact, there have been recent reports of mobile phone battery explosions and fires.

When a lithium secondary battery is exposed to high temperature, a passive film (Solid Electrolyte Interphase, SEI) on the surface of a negative electrode active material is dissolved or decomposed in a temperature range of 70° C. to 100° C. An electrolyte is additionally decomposed on the surface of an electrode on which the SEI is decomposed and gas and heat are generated to further increase an internal temperature of the battery. When the internal temperature is further increased, an electrolyte solution, a conductive agent, and a binder, which constitute the battery, are decomposed and oxygen may be released from a positive electrode to induce fire or explosion. In this case, since such a phenomenon is accelerated and a calorific value is increased as a state of charge (SOC) of the battery is higher, that is, charged energy is higher, there is a greater safety risk.

Also, when a lithium secondary battery is overcharged, since a positive electrode active material does not deintercalate lithium any more, a positive electrode voltage increases, and, thus, dissolution of the active material, electrolyte decomposition, and heat as well as collapse of a structure may occur. Furthermore, since an amount of lithium more than an amount, which may be stored in the active material, is forcibly supplied to a negative electrode, lithium ions are not stored in the negative electrode active material but are electrodeposited on the surface in a metallic state and grow. The lithium metal may not only grow in a needle shape to promote a side reaction with the electrolyte solution, but may also cause an internal short circuit in which the needle-shaped lithium metal penetrates a separator and is in contact with the positive electrode. When the internal short circuit occurs, a large amount of current instantaneously flows to generate heat, and this leads to an increase in the internal temperature of the battery, which may eventually lead to ignition or explosion. Particularly, the lithium metal reacts explosively with air or moisture to cause a serious problem in safety of the battery.

Typically, in order to improve stability of the lithium secondary battery, a method of installing a safety device suppressing overcharge, such as a protection circuit module (PCM), a positive temperature coefficient (PTC) device, and a current interruption device (CID), or adding an additive, such as a flame retardant, to an electrolyte solution or electrode active material, or a method of suppressing an internal short circuit by coating a separator with inorganic particles has been attempted.

However, in a case in which the additive, such as the flame retardant, is used in the electrolyte solution or electrode active material, a side reaction may occur due to the additive or battery performance, such as cycle characteristics, may be degraded. With respect to the coating of the separator, the internal short circuit may be prevented, but energy stored in the battery is not essentially removed, and thus, there have been limitations in that, although heat generation or ignition may be delayed during high-temperature exposure or overcharge, but the heat generation or ignition may not be completely suppressed.

PRIOR ART DOCUMENT

Patent Document (Patent Document 1) KR10-2000-0051682 A

DISCLOSURE OF THE INVENTION

Technical Problem

An aspect of the present invention provides a negative electrode active material which may dramatically improve stability of a battery while not degrading battery performance such as cycle characteristics, and a negative electrode and a lithium secondary battery which include the same.

Technical Solution

According to an aspect of the present invention, there is provided a negative electrode active material including: negative electrode active material particles which include artificial graphite in the form of a secondary particle and a carbon layer formed on a surface of the artificial graphite; and a coating layer which is formed on the negative electrode active material particle and includes a compound represented by Formula 1.

$$X_aY_b \qquad \text{<Formula 1>}$$

In Formula 1, X is a metal having no reactivity with lithium, Y is a metal or semi-metal having reactivity with lithium, a is an integer of 1 to 5, and b is an integer of 1 to 3. .

In this case, the compound represented by Formula 1 may have a bond dissociation energy between X and Y of 160 kJ/mol to 250 kJ/mol.

Specifically, in Formula 1, X is at least one element selected from the group consisting of copper (Cu), nickel (Ni), cobalt (Co), titanium (Ti), chromium (Cr), manganese (Mn), iron (Fe), vanadium (V), scandium (Sc), molybdenum (Mo), tungsten (W), mercury (Hg), and ruthenium (Ru), Y is at least one element selected from the group consisting of silicon (Si), tin (Sn), aluminum (Al), gallium (Ga), lead (Pb), germanium (Ge), indium (In), bismuth (Bi), silver (Ag), palladium (Pd), antimony (Sb), zinc (Zn), and magnesium (Mg), and, for example, the compound represented by Formula 1 may be $Cu_3Si$ or $Cu_3Sn$.

The compound represented by Formula 1 may be included in an amount of 0.1 wt % to 10 wt %, for example, 0.5 wt % to 5 wt % based on a total weight of the negative electrode active material.

Also, the compound represented by Formula 1 may be in the form of powder having an average particle diameter ($D_{50}$) of 1 μm to 5 μm, and the secondary particle of the artificial graphite may have an average particle diameter ($D_{50}$) of 10 μm to 30 μm.

According to another aspect of the present invention, there is provided a negative electrode including the above-described negative electrode active material according to the present invention, and a lithium secondary battery including the negative electrode.

Advantageous Effects

Since a negative electrode active material according to the present invention includes a coating layer, which includes a material having almost no reactivity with lithium at room temperature but having a high reactivity with the lithium at high temperature, on the surface thereof, lithium ions stored in a negative electrode active material and a material in the coating layer react to reduce a charged state of the negative electrode active material and suppress needle-shape growth of metallic lithium when a battery is exposed to high temperature or is overcharged. Thus, ignition and explosion of the battery may be suppressed.

Also, in the negative electrode active material according to the present invention, since artificial graphite in the form of a secondary particle having low expansibility and orientation is used and a carbon layer is formed on the surface of the artificial graphite, a battery, in which life characteristics are not degraded while stability is excellent, may be realized.

Mode for Carrying Out the Invention

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Negative Electrode Active Material

A negative electrode active material according to the present invention includes: negative electrode active material particles which include artificial graphite in the form of a secondary particle and a carbon layer formed on a surface of the artificial graphite; and a coating layer which is formed on the negative electrode active material particle and includes a compound represented by Formula 1 below.

$$X_aY_b \qquad \text{<Formula 1>}$$

In Formula 1, X is a metal having no reactivity with lithium, Y is a metal or semi-metal having reactivity with lithium, a is an integer of 1 to 5, and b is an integer of 1 to 3.

The negative electrode active material according to the present invention uses artificial graphite in the form of a secondary particle, wherein the secondary particle denotes a particle which is formed by agglomeration, combination, or assembly of a plurality of primary particles. The primary particle denotes an individual particle in a non-agglomerated state.

Typically, natural graphite having large capacity per unit weight has mainly been used as a carbon-based negative electrode active material, but, with respect to the natural graphite, since a degree of orientation is increased during rolling of an electrode, intercalation and deintercalation properties of lithium ions are deteriorated, and, as a result, resistance characteristics and life characteristics may be degraded. In contrast, artificial graphite has a relatively small degree of orientation during the rolling of the electrode and exhibits long life characteristics due to low expansibility.

Also, since the artificial graphite in the form of a secondary particle used in the present invention has a smaller degree of orientation and lower expansibility than artificial graphite in the form of a primary particle, it is advantageous in that lifetime and rapid charging performance are excellent due to low expansibility.

Negative electrode active material particles, in which a carbon layer is formed on the surface of the artificial graphite in the form of a secondary particle, are used as the negative electrode active material according to the present invention. In this case, the carbon layer, for example, may be formed by pyrolyzing at least one vapor or liquid carbon source selected from the group consisting of methane, ethane, ethylene, butane, acetylene, carbon monoxide, propane, polyvinyl alcohol, and propylene, or may be formed by mixing liquid or solid-phase pitch with artificial graphite and then sintering the mixture in a temperature range of 300° C. to 1,400° C. In this case, the pitch may be a coal-derived pitch or petroleum-derived pitch.

Thus, in a case in which the artificial graphite in the form of a secondary particle having the carbon layer formed on the surface thereof is used, better output characteristics and rapid charging performance may be obtained.

In this case, the carbon layer may be included in an amount of 1 part by weight to 10 parts by weight, for example, 2 parts by weight to 5 parts by weight based on 100 parts by weight of the artificial graphite. In a case in which the amount of the carbon layer satisfies the above range, excellent output characteristics and rapid charging performance may be achieved while minimizing reductions in capacity and initial efficiency of the negative electrode active material.

The negative electrode active material particles composed of the artificial graphite in the form of a secondary particle having the carbon layer formed thereon as described above may be included in an amount of 90 wt % to 99.9 wt %, for example, 95 wt % to 99.5 wt % based on a total weight of the negative electrode active material.

The negative electrode active material particles may have an average particle diameter ($D_{50}$) of 10 μm to 30 μm, for example, 15 μm to 25 μm. When the average particle diameter of the negative electrode active material particles satisfies the above range, dispersibility in a slurry is sufficiently secured, and excellent charging characteristics and life characteristics may be obtained.

The negative electrode active material according to the present invention includes a coating layer which includes a compound represented by the following Formula 1 on the surfaces of the above-described negative electrode active material particles, that is, the negative electrode active material particles composed of the artificial graphite in the form of a secondary particle having the carbon layer formed thereon.

$$X_a Y_b \qquad \text{<Formula 1>}$$

In Formula 1, X is a metal having no reactivity with lithium, Y is a metal or semi-metal having reactivity with lithium, a is an integer of 1 to 5, and b is an integer of 1 to 3.

Preferably, the compound represented by Formula 1 may have a bond dissociation energy between X and Y of 160 kJ/mol to 250 kJ/mol. In a case in which the bond dissociation energy of the compound represented by Formula 1 satisfies the above range, reactivity with lithium ions selectively appears depending on temperature, and, accordingly, ignition and explosion may be effectively suppressed when the battery is exposed to high temperature and is overcharged.

Specifically, in a case in which the compound represented by Formula 1 has the above-described bond dissociation energy, since the bond dissociation energy is not satisfied at room temperature, a bond between X and Y is maintained, and, thus, little reactivity with lithium appears. However, since the bond dissociation energy is satisfied when the temperature in the battery is increased to 50° C. or more, for example, 60° C. or more due to high-temperature exposure or overcharge, the bond between X and Y is broken, and, as a result, the element Y having a reactivity with lithium reacts with lithium, while being dissociated, to reduce a charging state of the negative electrode active material and suppress needle-shape growth of the metallic lithium. Thus, the ignition and explosion of the battery may be suppressed.

Preferably, in Formula 1, X may be at least one element selected from the group consisting of copper (Cu), nickel (Ni), cobalt (Co), titanium (Ti), chromium (Cr), manganese (Mn), iron (Fe), vanadium (V), scandium (Sc), molybdenum (Mo), tungsten (W), mercury (Hg), and ruthenium (Ru). Among these elements, Cu, Ni, and Fe may be more preferably used due to excellent price, processability, and electrical conductivity, and Cu may be most preferably used.

In Formula 1, Y may be at least one element selected from the group consisting of silicon (Si), tin (Sn), aluminum (Al), gallium (Ga), lead (Pb), germanium (Ge), indium (In), bismuth (Bi), silver (Ag), palladium (Pd), antimony (Sb), zinc (Zn), and magnesium (Mg), and may be preferably Si, Sn, and Al. Among these elements, Si and Sn, which have relatively better reactivity with lithium, may be particularly preferred.

Specifically, the compound represented by Formula 1 may be $Cu_3Si$ or $Cu_3Sn$.

The compound represented by Formula 1 may be included in an amount of 0.1 wt % to 10 wt %, for example, 0.5 wt % to 5 wt % based on the total weight of the negative electrode active material. In a case in which the amount of the compound represented by Formula 1 is less than 0.1 wt %, a stability improvement effect is insignificant, and, in a case in which the amount of the compound represented by Formula 1 is greater than 10 wt %, battery capacity may be reduced.

Also, the compound represented by Formula 1 may be in the form of powder having an average particle diameter ($D_{50}$) of 1 μm to 5 μm, for example, 1 μm to 3 μm. When the average particle diameter of the compound represented by Formula 1 satisfies the above range, coatability on the artificial graphite is excellent and the breakage of the X-Y bond may smoothly occur at high temperature or during overcharge.

The coating layer may be formed by mixing the negative electrode active material particles composed of the artificial graphite having the carbon layer formed thereon with the compound of Formula 1 and then performing a heat treatment in a temperature range of 400° C. to 800° C., for example, 500° C. to 700° C. In this case, the heat treatment may be performed in an inert atmosphere.

Negative Electrode

Next, a negative electrode according to the present invention will be described.

The negative electrode according to another embodiment of the present invention may include a negative electrode active material, and, herein, the negative electrode active material is the same as the above-described negative electrode active material. Specifically, the negative electrode may include a current collector and a negative electrode active material layer disposed on the current collector. The negative electrode active material layer may include the negative electrode active material. Furthermore, the negative electrode active material layer may further include a binder and/or a conductive agent.

The binder may include at least one selected from the group consisting of a polyvinylidene fluoride-hexafluoropropylene copolymer (PVDF-co-HFP), polyvinylidene fluoride (PVDF), polyacrylonitrile, polymethylmethacrylate, polyvinyl alcohol, carboxymethylcellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, polyacrylic acid, and polymers in which hydrogen thereof is substituted with lithium (Li), sodium (Na), or calcium (Ca), and may also include various copolymers thereof.

The conductive agent is not particularly limited as long as it has conductivity without causing adverse chemical changes in the battery, and, conductive materials, for example, graphite such as natural graphite and artificial graphite; carbon black such as acetylene black, Ketjen black, channel black, furnace black, lamp black, and thermal black; conductive fibers such as carbon fibers or metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Lithium Secondary Battery

Next, a lithium secondary battery according to the present invention will be described. The secondary battery according to another embodiment of the present invention may include a negative electrode, a positive electrode, a separator disposed between the positive electrode and the negative electrode, and an electrolyte, and the negative electrode is the same as the above-described negative electrode. Since the negative electrode has been described above, detailed descriptions thereof will be omitted.

The positive electrode may include a positive electrode active material. The positive electrode active material may be a typically used positive electrode active material. Specifically, the positive electrode active material may include a layered compound, such as lithium cobalt oxide ($LiCoO_2$) or lithium nickel oxide ($LiNiO_2$), or a compound substituted with one or more transition metals; lithium manganese oxides such as $Li_{1+y1}Mn_{2-y1}O_4$ ($0 \leq y1 \leq 0.33$), $LiMnO_3$, $LiMn_2O_3$, and $LiMnO_2$; lithium copper oxide ($Li_2CuO_2$): vanadium oxides such as $LiV_3O_8$, $V_2O_5$, and $Cu_2V_2O_7$; nickel (Ni)-site type lithium nickel oxide expressed by a chemical formula of $LiNi_{1-y2}M_{y2}O_2$ (where M is Co, Mn, Al, Cu, Fe, Mg, boron (B), or Ga, and y2 satisfies $0.01 \leq y \leq 0.3$); lithium manganese complex oxide expressed by a chemical formula of $LiMn_{2-y3}M_{y3}O_2$ (where M is Co, Ni, Fe, Cr, Zn, or tantalum (Ta), and y3 satisfies $0.01 \leq y3 \leq 0.1$) or $Li_2Mn_3MO_8$ (where M is Fe, Co, Ni, Cu, or Zn); and $LiMn_2O_4$ having a part of Li being substituted with alkaline earth metal ions, but the positive electrode active material is not limited thereto. The positive electrode may be Li-metal.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, ethylene carbonate and propylene carbonate, ring-type carbonates among the carbonate-based organic solvents, well dissociate a lithium salt in the electrolyte solution due to high dielectric constants as high-viscosity organic solvents, and thus, the ring-type carbonate may be preferably used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate may be more preferably used.

A lithium salt may be used as the metal salt, and the lithium salt is material that is readily soluble in the non-aqueous electrolyte solution, wherein, for example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

At least one additive, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, the present invention will be described in detail, according to specific examples. However, the following examples are merely presented to exemplify the present invention, and the scope of the present invention is not limited thereto. It will be apparent to those skilled in the art that various modifications and alterations are possible within the scope and technical spirit of the present invention. Such modifications and alterations fall within the scope of claims included herein.

EXAMPLE 1

Cu and Si were mixed in an atomic ratio of 3:1, and the mixture was melted by high-frequency heating in an argon atmosphere to obtain an alloy melt. The alloy melt was quenched by a gas atomizing method using argon gas with a pressure of 80 kg/cm$^2$ to prepare alloy powder having an average particle diameter of about 100 μm. In this case, a quenching rate was set as 1×10⁵ K/sec. A ball milling process was performed on the prepared alloy powder at 1,000 rpm for 15 hours to prepare $Cu_3Si$ having a particle diameter of 1 μm.

After the $Cu_3Si$ prepared as above was ball-milled with carbon-coated artificial graphite in the form of a secondary particle (average particle diameter: 21 μm), a heat treatment was performed at 600° C. for 6 hours in an argon (Ar) atmosphere to prepare negative electrode active material A in which the artificial graphite in the form of a secondary particle/carbon coating layer/$Cu_3Si$ coating layer were formed.

The negative electrode active material A prepared by the above-described method, Super C65 (conductive agent), a styrene-butadiene rubber (binder), and carboxymethylcellulose (thickener) were mixed in a weight ratio of 96.8:1:1:1.2 and water was added thereto to prepare a negative electrode slurry. A copper foil was coated with the negative electrode slurry and vacuum-dried at about 130° C. for 10 hours to prepare a negative electrode.

EXAMPLE 2

Negative electrode active material B was prepared in the same manner as in Example 1 except that Cu and Sn were mixed in an atomic ratio of 3:1 instead of mixing Cu and Si in an atomic ratio of 3:1. Also, a negative electrode was prepared in the same manner as in Example 1 except that the negative electrode active material B was used instead of the negative electrode active material A.

Comparative Example 1

Negative electrode active material C was prepared in the same manner as in Example 1 except that artificial graphite in the form of a secondary particle (average particle diameter: 20 μm) without carbon coating was used. Also, a negative electrode was prepared in the same manner as in Example 1 except that the negative electrode active material C was used instead of the negative electrode active material A.

Comparative Example 2

A negative electrode was prepared in the same manner as in Example 1 except that carbon-coated artificial graphite in the form of a secondary particle (average particle diameter: 21 μm) (referred to as "negative electrode active material D") was used as a negative electrode active material instead of the negative electrode active material A.

Comparative Example 3

Negative electrode active material E was prepared in the same manner as in Example 1 except that $Cu_3Si$ and carbon-coated artificial graphite in the form of a secondary particle (average particle diameter: 21 μm) were simply mixed without heat treatment, and a negative electrode was prepared in the same manner as in Example 1 except that the negative electrode active material E was used instead of the negative electrode active material A.

Experimental Example 1

The negative electrodes prepared in Examples 1 and 2 and Comparative Examples 1 to 3 were cut into an area of 1.4875 cm², and an electrode assembly was then prepared by disposing a polyethylene separator between the negative electrode and a positive electrode using a lithium metal foil with an area of 1.8 cm². Next, a non-aqueous electrolyte solution was prepared by adding 1 M $LiPF_6$ to a non-aqueous electrolyte solution solvent in which ethylene carbonate and diethylene carbonate were mixed in a volume ratio of 1:2, and the non-aqueous electrolyte solution was then injected into the electrode assembly to prepare a coin-type half secondary battery.

In the first 3 cycles, the half secondary batteries prepared as above were charged in constant current/constant voltage (CC/CV) mode at a rate of 0.2 C to a voltage of 5 mV and a cut-off current of 0.005 C, and discharged in CC mode at a rate of 0.2 C to a voltage of 1.0 V. Thereafter, the half secondary batteries were again charged at a rate of 1.5 C up to a state of charge (SOC) of 80%. Discharge capacity of each negative electrode active material in the first cycle was measured at 25° C. and 120° C. and presented in Table 1 below.

Also, after a profile of the negative electrode during charging at 1.5 C was differentiated to obtain a dV/dQ curve, a SOC at a point where an inflection point of the curve occurred was measured and determined as a point where lithium was precipitated, and the results thereof are presented in Table 1 below.

TABLE 1

| Category | Discharge capacity (mAh/g, 25° C.) | Discharge capacity (mAh/g, 120° C.) | Lithium precipitation point (25° C.) |
|---|---|---|---|
| Example 1 | 330 | 405 | No precipitation |
| Example 2 | 330 | 370 | No precipitation |
| Comparative Example 1 | 332 | 407 | 65% SOC |
| Comparative Example 2 | 350 | 353 | No precipitation |
| Comparative Example 3 | 350 | 375 | No precipitation |

As illustrated in [Table 1], with respect to the negative electrode active materials of Examples 1 and 2, discharge capacity at a high temperature of 120° C. was significantly increased in comparison to discharge capacity at 25° C. as a room temperature, and this indicated that the compound of Formula 1 included in the coating layer reacted with lithium ions while being dissociated at high temperature. Also, with respect to the negative electrodes in which the negative electrode active materials of Examples 1 and 2 were respectively used, lithium was not precipitated even if the secondary batteries were charged to 80% SOC.

In contrast, with respect to the negative electrode active material of Comparative Example 1 without a carbon layer, since lithium was precipitated at a point of 65% SOC, it may be confirmed that a stability improvement effect was reduced during overcharge.

With respect to the negative electrode active material of Comparative Example 2 without the coating layer including the compound of Formula 1, there was little difference between discharge capacities at room temperature and high temperature, and, with respect to the negative electrode active material of Comparative Example 3 in which the compound of Formula 1 was not coated and simply mixed, it may be confirmed that discharge capacity at high temperature was somewhat increased, but an increase amount of the discharge capacity was significantly smaller than those of Examples 1 and 2.

Experimental Example 2

LiCoO$_2$ (positive electrode active material), Super C65 (conductive agent), and PVDF (binder) were mixed in a weight ratio of 94:3:3 and NMP was added thereto to prepare a positive electrode slurry. An aluminum foil was coated with the positive electrode slurry and vacuum-dried at about 130° C. for 10 hours to prepare a positive electrode.

An electrode assembly was prepared by disposing a polyethylene separator between the positive electrode prepared as above and each of the negative electrodes prepared in Examples 1 and 2 and Comparative Examples 1 to 3. Next, a non-aqueous electrolyte solution was prepared by adding 1 M LiPF$_6$ to a non-aqueous electrolyte solution solvent in which ethylene carbonate and diethylene carbonate were mixed in a volume ratio of 1:2, and the non-aqueous electrolyte solution was then injected into the electrode assembly to prepare a polymer-type secondary battery.

In the first 3 cycles, the polymer-type secondary batteries prepared as above were charged in CC/CV mode at a current of 200 mA to a voltage of 4.4 V and a cut-off current of 50 mA, and discharged in CC mode at a current of 200 mA to a voltage of 3 V. Thereafter, an overcharge test was performed by charging the polymer-type secondary batteries at 1 C up to a voltage of 6.6 V. Cell charge capacity in the first cycle and overcharge results are presented in Table 2 below.

Also, in addition, the polymer-type secondary batteries were charged and discharged 500 times at 25° C. under the above charge and discharge conditions, and a ratio of discharge capacity in the 500$^{th}$ cycle to discharge capacity in the first cycle is presented in Table 2 below.

TABLE 2

| Category | Cell capacity (mAh/g) | Overcharge results | Capacity retention (%) |
|---|---|---|---|
| Example 1 | 1,000 | Pass | 90% |
| Example 2 | 1,000 | Pass | 88% |
| Comparative Example 1 | 1,000 | Explosion | 70% |
| Comparative Example 2 | 1,000 | Explosion | 91% |
| Comparative Example 3 | 1,000 | Explosion | 90% |

As illustrated in [Table 2], with respect to the batteries using the negative electrodes of Examples 1 and 2, explosion did not occur even during overcharge, and capacity retentions after 500 charge and discharge cycles were also excellent.

In contrast, with respect to the batteries using the negative electrodes of Comparative Examples 1 to 3, explosion occurred during overcharge. Also, with respect to the battery using the negative electrode of Comparative Example 1, it may be confirmed that capacity retention after 500 charge and discharge cycles was significantly reduced.

The invention claimed is:

1. A negative electrode active material comprising:
   negative electrode active material particles which comprise artificial graphite in a form of a secondary particle and a carbon layer formed on a surface of the artificial graphite, and
   a coating layer which is formed on the negative electrode active material particle and comprises a compound represented by Formula 1:

$X_aY_b$ <Formula 1> wherein, in Formula 1, X is a metal having no reactivity with lithium, Y is a metal or semi-metal having reactivity with lithium, a is an integer of 1 to 5, and b is an integer of 1 to 3,
   wherein X is at least one element selected from the group consisting of copper (Cu), nickel (Ni), cobalt (Co), titanium (Ti), chromium (Cr), manganese (Mn), iron (Fe), vanadium (V), scandium (Sc), molybdenum (Mo), tungsten (W), mercury (Hg), and ruthenium (Ru), and
   Y is at least one element selected from the group consisting of tin (Sir), aluminum (Al), gallium (Ga), lead (Pb), germanium (Ge), indium (In), bismuth (Bi), silver (Ag), palladium (Pd), antimony (Sb), zinc (Zn), and magnesium (Mg).

2. The negative electrode active material of claim 1, wherein the compound represented by Formula 1 has a bond dissociation energy between X and Y of 160 kJ/mol to 250 kJ/mol.

3. The negative electrode active material of claim 1, wherein the compound represented by Formula 1 is Cu$_3$Sn.

4. The negative electrode active material of claim 1, wherein the compound represented by Formula 1 is included in an amount of 0.1 wt % to 10 wt % based on a total weight of the negative electrode active material.

5. The negative electrode active material of claim 1, wherein the compound represented by Formula 1 is in a form of powder having an average particle diameter (D$_{50}$) of 1 μm to 5 μm.

6. The negative electrode active material of claim 1, wherein the secondary particle of the artificial graphite has an average particle diameter (D$_{50}$) of 10 μm to 30 μm.

7. A negative electrode comprising the negative electrode active material of claim 1.

8. A lithium secondary battery comprising the negative electrode of claim 7.

* * * * *